United States Patent
Pelc et al.

(10) Patent No.: US 11,896,907 B2
(45) Date of Patent: Feb. 13, 2024

(54) SYSTEMS, METHODS AND COMPUTER PROGRAMS FOR DELIVERING A MULTIPLAYER GAMING EXPERIENCE IN A DISTRIBUTED COMPUTER SYSTEM

(71) Applicant: Gecko Garage Ltd, Sliema (MT)

(72) Inventors: Karolina Pelc, Sliema (MT); Cristina Turbatu, Sliema (MT)

(73) Assignee: Gecko Garage Ltd, Sliema (MT)

( * ) Notice: Subject to any disclaimer, the term of this patent is extended or adjusted under 35 U.S.C. 154(b) by 0 days.

(21) Appl. No.: 17/876,932

(22) Filed: Jul. 29, 2022

(65) Prior Publication Data

US 2023/0226451 A1    Jul. 20, 2023

(30) Foreign Application Priority Data

Jan. 14, 2022 (EP) .................................. 22382018

(51) Int. Cl.
| | |
|---|---|
| A63F 13/77 | (2014.01) |
| A63F 13/71 | (2014.01) |
| A63F 13/48 | (2014.01) |
| A63F 13/35 | (2014.01) |

(52) U.S. Cl.
CPC .............. *A63F 13/77* (2014.09); *A63F 13/35* (2014.09); *A63F 13/48* (2014.09); *A63F 13/71* (2014.09); *A63F 2300/532* (2013.01)

(58) Field of Classification Search
CPC .......... A63F 13/77; A63F 13/35; A63F 13/48; A63F 13/71
See application file for complete search history.

(56) References Cited

U.S. PATENT DOCUMENTS

| | | | |
|---|---|---|---|
| 10,398,986 B1 * | 9/2019 | Henroid | A63F 13/795 |
| 10,974,140 B1 * | 4/2021 | Verfaillie | A63F 13/32 |
| 11,504,617 B2 * | 11/2022 | Pare | A63F 13/335 |

(Continued)

OTHER PUBLICATIONS

Pelc et al., Systems, methods and computer programs for delivering a multiplayer gaming experience in a distributed computer system. Co-pending U.S. Appl. No. 17/876,896, filed Jul. 29, 2022.

(Continued)

*Primary Examiner* — William H McCulloch, Jr.
*Assistant Examiner* — Ankit B Doshi
(74) *Attorney, Agent, or Firm* — Wolf, Greenfield & Sacks, P.C.

(57) ABSTRACT

A multiplayer software "wrapper" is provided around a conventional single-player modality game. The wrapper allows multiple players, each with their own player device, to share a common multiplayer game session. The single player game is hosted on a game server and is coded to support only a single player device. The wrapper provides a multiplayer interface to the single-player game in a way that does not require any modification of the underlying game code or game server architecture. A centralized and automated gameplay system sits between, on the one hand, the multiple player devices and, on the other hand, the gameplay server hosting the single player. The gameplay system collects game instructions from multiple player devices and determines single-player inputs to the game based on the game instructions from the multiple player devices.

20 Claims, 11 Drawing Sheets

(56) References Cited

U.S. PATENT DOCUMENTS

| | | | |
|---|---|---|---|
| 2005/0043089 A1* | 2/2005 | Nguyen | A63F 13/12 |
| | | | 463/16 |
| 2011/0195766 A1* | 8/2011 | Toompere | G07F 17/32 |
| | | | 463/43 |
| 2014/0128163 A1* | 5/2014 | Almog | A63F 13/12 |
| | | | 463/42 |
| 2015/0058205 A1 | 2/2015 | Li | |
| 2019/0244487 A1* | 8/2019 | Donadio | G07F 17/322 |
| 2019/0366210 A1 | 12/2019 | Beltran et al. | |
| 2020/0139237 A1 | 5/2020 | Butler et al. | |
| 2021/0299574 A1* | 9/2021 | Pare | A63F 13/355 |
| 2022/0303331 A1* | 9/2022 | Svennebring | H04N 21/64738 |
| 2022/0327886 A1 | 10/2022 | Mathur et al. | |
| 2022/0358450 A1* | 11/2022 | Stephens | A63F 13/73 |

OTHER PUBLICATIONS

International Search Report and Written Opinion for International Application No. PCT/EP2023/050240, dated Apr. 11, 2023.
[No Author Listed] Steam Support: Steam Remote Play. Steam. http://web.archive.org/web/20220109221544/https://help.steampowered.com/en/faqs/view/0689-74B8-92AC-10F2. Last accessed Jan. 9, 2022:1-4.

\* cited by examiner

SYSTEMS, METHODS AND COMPUTER PROGRAMS FOR DELIVERING A MULTIPLAYER GAMING EXPERIENCE IN A DISTRIBUTED COMPUTER SYSTEM

CROSS REFERENCE TO RELATED APPLICATIONS

This application claims priority to European application number 22382018.4, filed Jan. 14, 2022. The contents of which is incorporated by reference in its entirety.

TECHNICAL FIELD

The present disclosure pertains to a gameplay system for delivering a multiplayer gaming experience within a distributed computer system that includes multiple player devices operable to engage in a multiplayer gaming session, and to related methods, computer programs and infrastructure.

BACKGROUND

Computer-implemented games generally have one of two player modalities: single-player and multiplayer. A single-player modality (or "one-on-one") game has game logic to support interactions with a single player only. Conceptually, a single user plays against the computer as a sole activity. By contrast, multiplayer games have logic to support multiple players who might, for example, be competing with each other or cooperating towards some common goal. In a home or arcade setting, for example, a games console or the like may be provided to support multiplayer operation. By contrast, in a distributed computing environment, each player operates their own player device (e.g. a mobile device, such as a smartphone, tablet etc.). Conventionally, the player devices would communicate with some central game server hosting the multi-player game, via the internet or another suitably configured computer network. Single-player and multi-player games generally provide markedly different gameplay experiences, supported by different game logic (code) that is not readily transferable from one modality to the other.

SUMMARY

Aspects and embodiments herein provide a multiplayer software "wrapper" around a conventional single-player modality game that allows multiple players, each with their own player device, to share a common multiplayer game session. The single player game is hosted on a game server and is coded to support only a single player device. The wrapper provides a multiplayer interface to the single-player game in a way that does not require any modification of the underlying game code or game server architecture. A centralized and automated gameplay system sits between, on the one hand, the multiple player devices and, on the other hand, the gameplay server hosting the single player game. The gameplay system collects game instructions from multiple player devices and determines single-player inputs to the game based on the game instructions from the multiple player devices. The gameplay system effectively operates as a single player participating in the single player game (replacing the single player device that the game is coded to support), collating and actioning game instructions from the multiple player devices. The multiplayer wrapper integrates seamlessly with any "third-party" game provider, and operates as an independent side-system that requires minimal code/architectural changes within the third-party system.

The implementation of a multiplayer wrapper presents various technical challenges. One such challenge is security, and in particular the need to validate a game instruction received from a given player. In many gaming contexts, the options available to a given player at a particular point in time may be limited. For example, certain choices within the game might only be permitted when a player has a certain quantity of game resources available to them at that point in time.

Game resources may persist beyond a current game instance. One option in that case is to persistently record a player's game resources in a player account that is secured via some appropriate player authentication mechanism. In a conventional single-player setup, it is relatively straightforward for the game server to validate a game instruction from a single player device. At the start of a game session, the single player device is authenticated against a single player wallet. During the game, when a game instruction is received from the single player device, the game server simply validates the game play instruction against the player wallet before proceeding (e.g. to verify that sufficient game resources are available). However, the aforementioned tasks are more challenging in the present context, as game instructions from multiple players need to be validated against multiple player accounts that are maintained in a separate third-party account provider system (from the perspective of the multiplayer wrapper).

A first aspect herein is directed to computer-implemented method of delivering a multiplayer gaming experience by a gameplay system, the gameplay system in communication with a first player device and a second player device, the method comprising: establishing a multiplayer game session between the gameplay system, the first player device and the second player device; transmitting a game initiation message from the gameplay system to a game server, and thereby causing the game server to initiate a single-player modality game associated with the multiplayer game session; receiving at the gameplay system a first game instruction from the first player device; receiving at the gameplay system a second game instruction from the second player device; transmitting to an account provider system one or more validation messages indicating the first and second game instructions for validating the first and second game instructions based on first and second player accounts associated with the first and second player devices respectively; receiving from the account provider system one or more validation responses indicating whether the first and second game instructions are valid; based on the one or more validation responses, determining a shared game parameter for the single-player modality game; causing the shared game parameter to be transmitted to the game server; receiving a game result from the game server, the game result having been generated at the gameplay server by implementing a game action in the single-player modality game based on the shared game parameter; and communicating the game result from the gameplay system to the first player device and the second player device in the multiplayer game session.

In embodiments, a "virtual" session wallet may be provided, which is updated based on the game instructions from the multiple player devices once they have been validated. For example, each player instruction might commit a quantity of game resources in advance of a particular game action. In that case, each player instruction might be validated against the associated player wallet to verify that the player in question has sufficient game resources available, with the total quantity of validly-committed resources being recorded in the shared wallet. Thereafter, the game server can interface with the (single) shared wallet, in the same way that it would interface with a single player wallet in a conventional single-player setup.

In embodiments, the method may comprise associating a session account with the multiplayer game session, wherein the session account is indicated to the game server, and is accessible to the game server for validating the shared game parameter; and updating the session account based on the one or more validation responses received from the account provider.

The game result received from the game server may indicate that the session account has been updated by the game server, and the method may comprise accessing by the gameplay system, responsive to receiving the game result, the session account as updated by the game server; and transmitting, to the account provider system, one or more update messages based on the session account as updated by the game server, the one or more update messages causing the first and second player accounts to be updated.

The session account may be indicated to the game server by a shared account token in the game initiation message to be authenticated by the game server.

The multiplayer game session may be instigated initially between the gameplay system and the first player device responsive to a session instigation request received from the first player device, the first player device being authenticated with the account provider responsive to the session instigation request. Responsive to instigating the game session, the game initiation message may be transmitted to the game server. The second player device may be subsequently added to the multiplayer game session responsive to a join request identifying the multiplayer game session and received from the second player device, the second player device being authenticated with the account provider responsive to the join request without any interaction between the gameplay system and the game server.

The session account may be associated with the multiplayer game session responsive to the session instigation request from the first player device.

The method may comprise instantiating a game client at the gameplay system, thereby creating a game client instance associated with the multiplayer game session, and the game parameter may be provided as an input to the game client, thereby causing the game client instance to transmit the game parameter to the game server.

Establishing the multiplayer game session may include authenticating the first and second player devices with the account provider system.

Another challenge is game rendering. In a conventional single-player setup, the game experience would be delivered at the single player device by a game client executed on the player device. The game client could, for example, be a web browser or other form of web client, with the game being hosted as a web application. Typically, the web client is responsible for rendering game visuals based on inputs received from the user and outputs received from the game server. For example, in a web application, the rendering functionally may be coded in one or more JavaScript (JS) packages delivered to the web client. However, this client-server architecture does not extend straightforwardly to deployments based on the multiplayer wrapper.

According to a second aspect herein, there is provided a computer-implemented method of delivering a multiplayer gaming experience in a distributed computer system, the method comprising: establishing a multiplayer game session between a gameplay system, a first player device and a second player device; instantiating a game client at the gameplay system, thereby creating a game client instance associated with the multiplayer game session; receiving at the gameplay system a first game instruction from the first player device; receiving at the gameplay system a second game instruction from the second player device; providing at least one input to the game client instance at the gameplay system based on the first and second game instructions, thereby causing the game client instance to instigate a game action at a game server in dependence thereon; receiving at the game client instance a game result from the game server, the game result generated by performing the game action at the game server; generating, by the game client instance, a sequence of image data for visually rendering the game result as received from the game server; and at the gameplay system, capturing the sequence of image data in a first real-time video stream transmitted to the first player device and a second real-time video stream transmitted to the second player device.

Here, the game client runs within the intermediate gameplay system. Game visuals generated by the game client are captured in real-time video streams transmitted to the player devices using some appropriate video streaming protocol (or protocols). Such protocols are widely supported and each client device simply needs to have the capability to receive and decode a real-time video stream.

For example, the game client might generate game visuals within a graphical user interface (GUI) and a video image of the GUI may be captured in the video streams using a form of "screen-capture" mechanism (despite the name, this would not generally require the GUI to actually be rendered on a physical display).

In embodiments, the game client may be a web client, and the method may comprise receiving from the game server a game resource indicator for use by the game client in communicating with the game server.

Further optional features of the computer-implemented method of the second aspect may be as defined herein in relation to the method of the first aspect. Furthermore, further optional features of the computer-implemented method of the first aspect may be as defined herein in relation to the method of the second aspect.

A further aspect herein is directed to a gameplay system comprising a memory operable to store program code and one or more computer processors couples to the memory for executing the program code, the program code configured, when executed, to implement the method of any of the above aspects or embodiments.

A further aspect herein is directed to a distributed computer system comprising the gameplay system defined herein.

A further aspect is directed to computer program code configured, when executed in a gameplay system, to implement the same.

BRIEF DESCRIPTION OF THE FIGURES

Particular embodiments will now be described, by way of example only, with reference to the accompanying figures, in which.

Corresponding reference numerals are used to refer to corresponding elements throughout the drawings.

DETAILED DESCRIPTION

Figure 1:
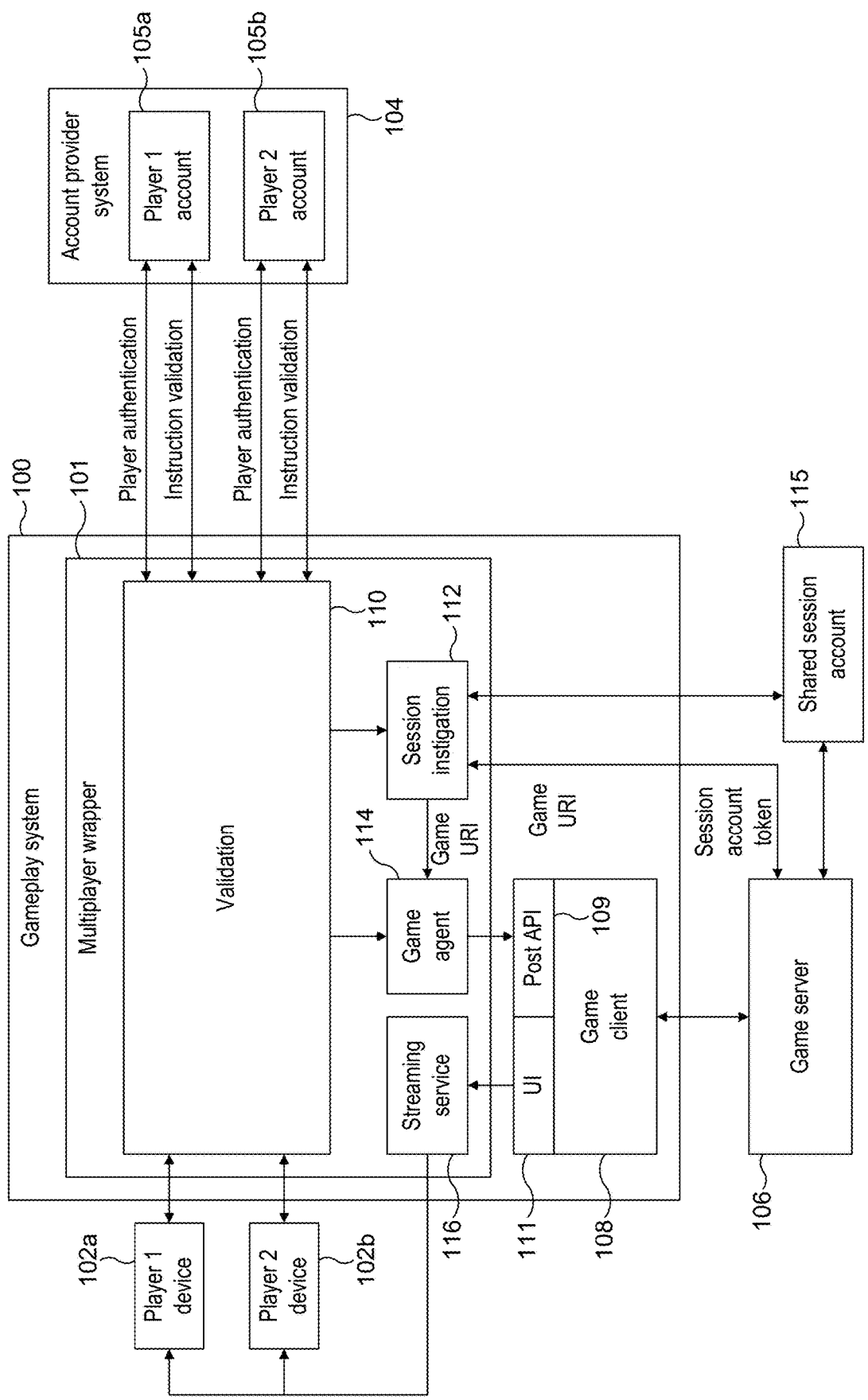
FIG. 1 is a schematic block diagram of an example distributed computer system comprising an example gameplay system.

FIG. 1 shows a highly schematic block diagram of a distributed computer system in which a multiplayer gaming experience is delivered. The computer system is shown to comprise a gameplay system 100, a first player device 102a, a second player device 102b, and account provider system 104 and a remote game server (RGS or "Remote Game Server") 106. Two player devices are shown for simplicity, but the gameplay system 100 can serve any number of player devices, and two or more than two player devices may participate in a given multiplayer game session.

The gameplay system 100 is implemented at the hardware level as one or more computer devices, such as servers (e.g. one or more virtual servers running on one or more physical machines). The account provider system 104 and the game server 106 are "third-party" systems (from the perspective of the gameplay system 100) that are operated and maintained independently of the gameplay system 100. Accordingly, the account provider system 104 and/or the game server 106 may be disposed separately or remotely from the gameplay system 100. The gameplay system 100 implements a "multiplayer wrapper" 101 that provides a multiplayer interface to a single player game hosted on the game server 106. The wrapper 101 is shown to comprise a validation component 110, a session instigation component 112 (also referred to herein as the Core), a game agent 114 and a streaming component 116.

The functions performed by the various systems and components of FIG. 1 are summarized below.

In the following examples, it is assumed the first player device 102a causes a multiplayer game session to be instigated, which the second player device 102b subsequently joins. However, in other examples, the second player device 102b may be the device that causes the multiplayer game session to be instigated, which the first player device 102a subsequently joins. The validation component 110 authenticates the player devices 102a, 102b wishing to establish or join the game session.

The validation component 110 receives a session instigation request from the first player device 102a, and authenticates the first player device 102a with the account provider system 104 in response. The first player device 102a is authenticated against a first player account 105a indicated in the session instigation request that is maintained by the account provider system 104. The first player device 102a provides a game launch token that allows it to be authenticated against the correct player account 105a. The game launch token gets sent to the gameplay system 100 from a portal of the account provider system 104 during the game launch procedure. This token is then sent to the first player account 105a for validation and to obtain a more durable transaction token. In other examples, the In response to successful authentication of the first player device 102a, a multiplayer game session is instigated between (initially) the first player device 102a and the gameplay system 100.

Server-side, a new single-player game session is created between the gameplay system 100 and the RGS 106, with the game agent 114 as the sole player. To establish the single player game session, the session instigation component 112 transmits a session account token to the gameplay server. The session account token is uniquely associated with a single shared session account 115 assigned to the multiplayer game session. From the perspective of the RGS 106, this appears no different than a regular player account that would normally support a single player game. The RGS 106 validates the session account token against the shared session account 115.

In the present example, the game is implemented as a web application delivered by the gameplay system 106. Assuming the shared account token is valid, the RGS 106 returns a unique game resource identifier (such a URL or URI) for the single player game session to the shared session account 115. At the gameplay system 100, a new game client instance 108 is created for the multiplayer game session, and the game resource indicator is passed to the new game client instance 108 via the game agent 114. Thereafter, the single player game is delivered to the game client instance 108 as in the same way as it would be delivered to a game client running on a player device in a conventional setup. Following these initial set up steps, communication between the gameplay system 100 and the RGS 106 occurs via the game client instance 108.

Following the instigation of the multiplayer game session, the validation component 110 adds the second player device 102b to the multiplayer session in response to a join request from the second player device 102b. In the same manner as the first player device 102a, the validation component 110 authenticates the second player device 102b with the account provider system 104 against a second player account 105b indicated in the join request. Assuming successful authentication, the second player device 102 is added to the multiplayer game session. Note, this is invisible to the RGS 106, and does not require any further interaction with the gameplay server 106 or the shared session account 115 at this point.

The validation component 110 is also responsible for validating game instructions received from each player device 102a, 102b within the multiplayer game session. A game instruction received from one of the player devices 102a, 102b is validated against the same player account 105a, 105b as used to authenticate that player device.

The game agent 114 is responsible for collating valid game instructions and instigating a game action within the single player game based on the valid game instructions it has collated.

For example, certain choices within the game might only be permitted when a player has sufficient game resources available to them. Such resources might, for example, include (virtual) items that the player has collected within a game or otherwise obtained, or resources required to, for example, obtain some item with a game or place a bet in the context of a betting game. The examples below consider a single player betting game (such as "slot betting"), in which a single player places a bet of a certain amount, with a win/lose outcome then determined at the RGS 106. In such contexts, player accounts may be referred to as "wallets". In this example, a game parameter provided to the game server 106, as an input to the game client 108, indicates the bet amount. As will be appreciated, this is merely one example use case. The system architecture described herein is highly flexible, and can support a range of games, game instructions and game actions. Robust validation of game instructions with the account provider system 104 is crucial in circumstances where game resources carry financial liability or have significant real-world value. However, the described system can be deployed in any circumstances where game instructions need to be validated against a player account.

In a conventional, single-player setup, a single player game session would be created between the game server 106 and a single player device. The single player device would be authenticated against a single player wallet held in the account provider system 104. When a bet instruction is subsequently received from the single player device, this would be validated against the single player wallet and accepted if the player wallet has sufficient funds to cover the bet. Following a successful "win" outcome, the player account would be debited by the game server 106 with the player's winnings.

The described system mirrors this interaction flow as closely as possible. The difference is that the game agent 114 assumes the role of player, and the shared wallet 115 replaces the player wallet. Prior to game play, bets are received from each player device 102a, 102b and validated against their respective player wallets 105a, 105b. Assuming each player has sufficient funds, their bet is temporarily transferred to the shared wallet 115. The game agent 114 determines the total bet amount (one example of a shared game parameter) and, at a suitable point in time (e.g. upon expiration of a timer, or when bets have been received from all players), the game agent 114 places a bet for the total amount. Preferably a light-weight application programming interface (API) 109 is exposed by the game client 108 for this purpose. The total bet is relayed from the game client 108 to the game server 106, which in turn validates the total bet against the shared wallet 115 (recall that, by this point, the required funds have been transferred from the player wallets 105a, 105b to the shared wallet 115). If the outcome is successful, the winnings are transferred to the shared session account 115, as a single total sum—it is the responsibility of the game play system 110 to divide these between the players in proportion to the respective bets, and transfer the correct proportions to the player wallets 105a, 105b.

Beyond slot games, more generally the gameplay system 100 can provide a multiplayer interface to any single player game (or, to put it another way, any "one-on-one" player-to-machine form of game mechanic). The RGS 106 does not know (and does not need to know) how to manage and adapt transactions within this game to a set of players, and continues to provide a one-on-one game modality.

Whilst slot games are considered by way of example, the same principles can be applied to any single player game in which multiple players share resources that are accumulated temporarily in the shared session account 115.

The game client 108 generates a graphical user interface (GUI) 111, as it would if it were running on a regular player device. However, the GUI is not rendered on a physical display. Instead, it is captured at the gameplay system 100 by the streaming component 116, and transmitted to each player device 102a, 102b in a real-time video stream. This allows game visuals, such as a slot machine "animation", to be communicated to the player devices 102a, 102b for displaying thereat.

From a technical perspective, the gameplay system 100 provides a wrapper 102 of single play games such as traditional online slot games that allows players to share a common multiplayer game session. The game agent 114 transmits a shared game parameter (e.g. places a pooled bet) triggered by defined user instruction within the game and then streams the gameplay session to the participants and viewers.

From the perspective of the account provider system 104, the gameplay system 100 functions as a multiplayer slot game, with an add on that allows bets to be pooled inside the shared wallet 115. In the described implementations, funds never leave the account provider system 104 and are not held in the gameplay system 100.

From the perspective of the RGS 106, the gameplay system 100 sends through the collective actions or events of "change bet value to pooled value", "spin" (the game action) and "read" (to determine the outcome) that are decided by the interactions of players with the game.

In the examples described below, the shared wallet 115 is maintained in the account provider system 104, in essentially the same way as a player account.

In an alternative implementation, the shared wallet 115 is maintained in the gameplay system 100. Even in this case, it is not necessary to move funds into the gameplay system 100. The concept of a pooled sum is still used, but "actual" funds are not moved from the player wallets 105a, 105b to the shared wallet 115. This assumes the single player game can be instigated in a "free play" mode that, in normal circumstances, would not include real funds at all. In the scenario where the gameplay system 100 holds the pooled wallet 115, free play game can be used, taking advantage of the in-game calculations.

The shared or "pooled" wallet 115 aims to keep the protocol between the RGS 106 and the shared wallet 115 of players intact.

When the shared wallet 115 is held in the account provider system 104, ahead of connecting an integration layer of the account provider system 104 with the gameplay system 100, some number (n) of accounts are set up in the account provider system 104 with a balance of 0. These are not real player accounts, in the sense that they are not intended for use as regular player accounts. Instead, the accounts are used as generic game launch tokens that can be mapped back to the gameplay system 100 (the "pooled wallets").

When a session is created and starts in the gameplay system 100, a "start game session" command is sent to the account provider system 104 notifying it that a game session has started on the gameplay system 100 with a unique game identifier (GameId X). At this stage, no information is provided that this is a wrapper on a particular game content unit (ContentUnit A).

From the perspective of the game server 106, the model of operation of the gameplay system 100 relies on the ability to control, through an automatic system, a third-party Game Client 108.

Players will join a multiplayer session on the gameplay system 100, opt in to participate per game round and place their bet. After all players have locked their stakes in, a spin on the game will be made (either through their actions, voting system or automatic decision).

A game client user interface (UI) 111 is launched on a server of the gameplay system 100. The gameplay system 100 casts a video of this game through streaming technologies into client software, running on the player devices 102a, 102b. The spin needs to be performed at the game client 108 level—the UI with the provider game—as the game is streaming from that video. If bet actions were instead sent straight to the RGS 106, the provider game client would not show any game animations.

A wallet transaction solution records each player's contribution per round, then places an automatic bet with the pooled value through the automatic system that controls the content provider game client. In implementations in which the shared wallet 115 sits in the licensee system 104, the account provider system 100 provides the gameplay system 100 with a sufficiently large number (e.g. 1000+) game access tokens with their balances initially set to zero. This may reduce the risk that the tokens are compromised).

This method relies on the operator of the account provider system 104 setting up their system with some empty balance accounts and, on gameplay, to have the ability to increase the balance of these accounts per game round ahead of any bet placed. This is somewhat unusual for casino games but can be implemented in existing systems using bonus calls.

In other implementations, this dependency on the account provider system 104 is removed, further simplifying the integration process from the perspective of the operator of the account provider system 104. In such implementations, the concept of accounts for the automatic system can be moved into the gameplay system 100. Instead of creating accounts, the gameplay system 100 will be able to just generate launch tokens for the game with a conceptual balance of 0. The interaction between the RGS 106 and the shared wallet 115 is unchanged.

Returning to the creation of a multiplayer game session, in some implementations, when the gameplay system 100 instantiates a new multiplayer session it will launch a game instance with one or more configuration parameters. These may include one or more of pooled currency, landscape mode, language, bet limits (minBet/maxBet/maxWin/coin sizes).

After the game instance is launched, the system 100 may send may one or more commands to the game server 106 or game instance 108. These may for example include mute/unmute/volume change commands. This may alter the volume of any sound effects associated with the game that are then subsequently streamed to the player devices 102. In case the game has a pop-up display before starting, the system 100 may send a dismiss window command. This may for example prevent the pop-up display being streamed to the player devices 102.

Subsequently, the gameplay system 100 will read the pooled wallet 115 balance through a read balance command.

Once players have joined the game and placed their bets, a change stake command and spin command are placed. The updated pooled wallet balance should have been sent through by this point.

The gameplay system 100 will wait for a "ready" event from game client 108 before sending an action through (spin/select bonus/change stake). This is needed in case the game client 108 has some animations that the gameplay system 100 needs to wait for before sending through further commands.

Game client 108 will send results of a spin to the gameplay system 100. This may occur before the eventual win animation is ready, for example by receipt of a separate message at the game agent 114. The game client 108 may also send an updated pooled wallet 115 balance in the case of a loss as well as a win.

In case of bonus rounds, the system 100 should have the ability to read and select multi options.

On bet placement, the credit pooled amount and debit pooled amount commands can be placed either at the end of the timer as a total amount, or incremental, after every successful real bet. To reduce traffic and potential reconciliation scenarios, the former may be chosen. This may be an example of the system 100 receiving a plurality of game instructions from the first and/or second player devices 102, and accumulating or collating the game instructions before transmitting the shared parameter.

In one example, a secure token is needed to launch the game client 108. With the secure token, the RGS 106 knows to authenticate that the game is launched in the context of a wallet 105 of the account provider system 104 (or in the context of a pooled wallet 115).

Figure 2A:
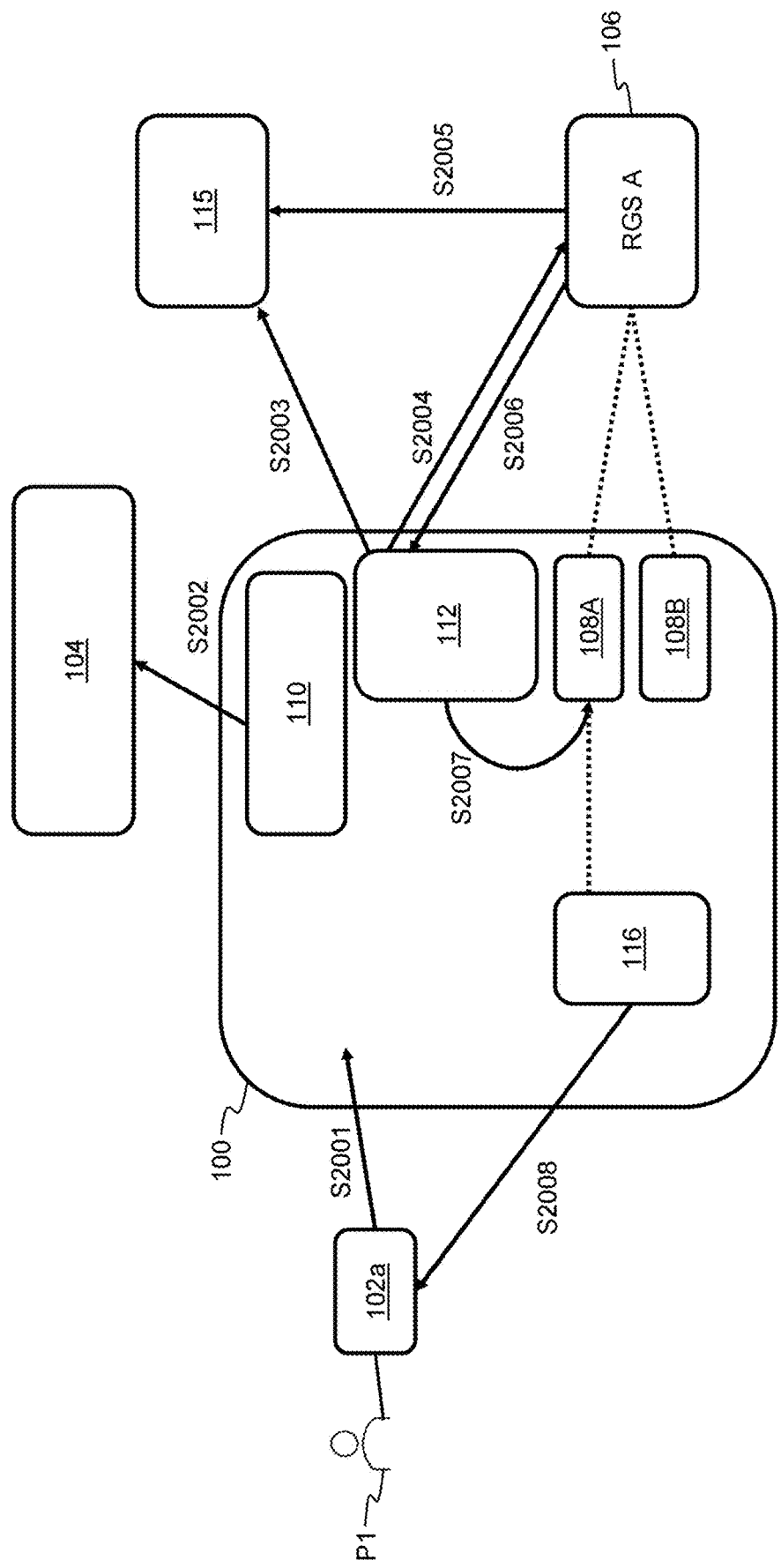
FIGS. 2A-2C are a schematic flow diagrams illustrating example operations of a gameplay system.

FIG. 2A illustrates a series of operations associated with the gameplay system 100 described herein. Particularly, FIG. 2A illustrates the process of establishing a multiplayer game session using a first player device 102a.

Initially, first player device 102a, which is operated by player P1, initiates a new session with the gameplay system 100 in step S2001. This may comprise generating a session instigation request which is transmitted to the gameplay system 100. The first player device 102a may comprise front end software or access a front end provided by the system 100. The system 100, for example validation component 110, authenticates the first player device 102a against the account provider system 104 in step S2002.

Assuming the authentication is successful, in step S2003 the system 100 obtains a game launch token from a shared session account 115. In step S2004, the system 100 launches a first game, Game A, on the game server A 106, using the game launch token. In step S2005, the game server 106 authenticates the game launch token against the shared session account 115. In response to successful authentication, the game server 106 provides the system 100 with a unique game resource identifier such as a URL or URI in step S2006. One or more of steps S2003, 2004 and S2006 be carried out by the session instigation component 112.

In step S2007, the game client 108A is launched using the game resource identifier. FIG. 2A illustrates that the system 100 may comprise a plurality of game clients 108A, 108B connected to a game server 106. In Step S2008, Game A is streamed to the first player device 102a.

Figure 2B:
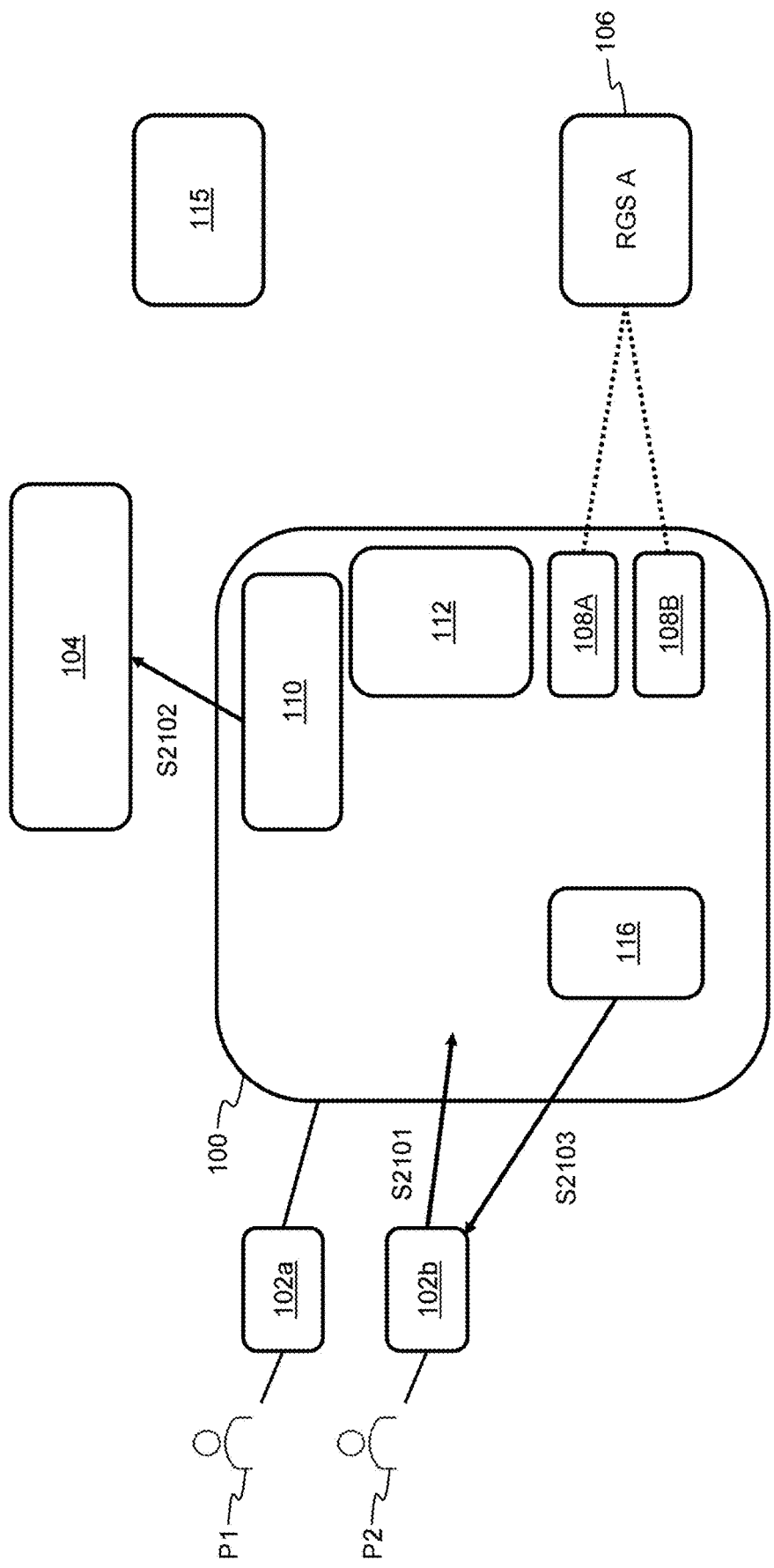

FIG. 2B illustrates another series of operations associated with the gameplay system 100 described herein.

In a step S2101, a second player device 102b, which may be operated by a second player P2 joins an existing session previously initiated by the first player device 102a. This may comprise generating a session join request which is transmitted to the gameplay system 100. Subsequently, in step S2102, the second player device 102b is authenticated against the account provider system 104. Subsequently, in step S2103, Game A is streamed to the second player device 102b. Notably, no interaction with the game server 106 or the shared session account 115 is required to add the second player device 102b into the existing session.

Figure 2C:
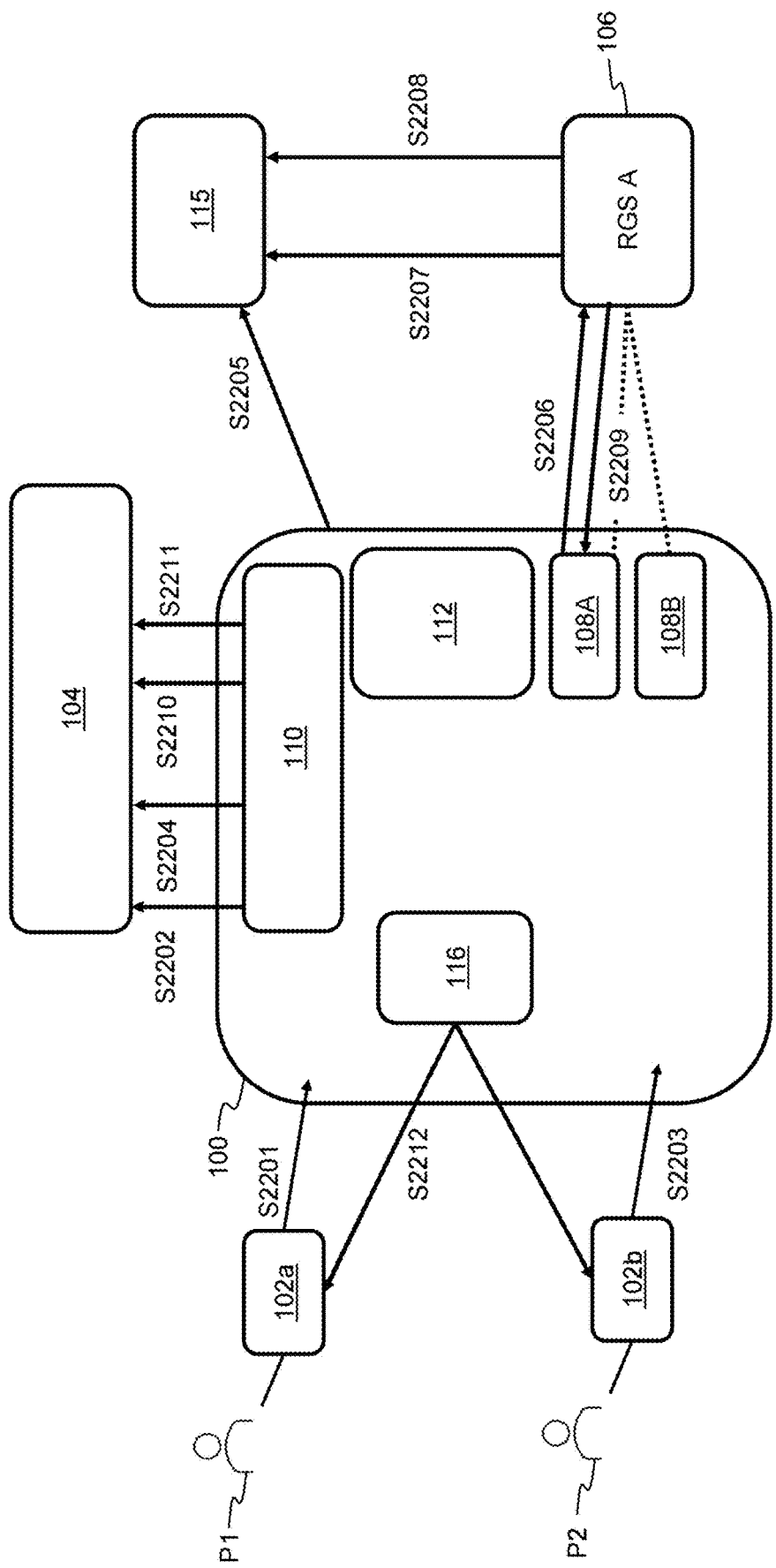

FIG. 2C illustrates another series of operations associated with the gameplay system 100 described herein.

In a step S2201, the system 100 receives a first game instruction from the first player device 102a. For example, the first game instruction may be an instruction to place a bet having a value, such as 4 EUR. In step S2202, the system 100 (e.g. validation component 110) validates the game instruction, for example by checking sufficient funds are available in the account 105a of first player 102a. This may involve sending a validation message to the account provider system 104, and receiving a validation response indicating that the instruction is valid. This may also cause the account 105a to be updated, for example based on the value of the bet.

In a step S2203, the system 100 receives a second game instruction from the second player device 102b. For example, the second game instruction may be an instruction to place a bet having a value, such as 6 EUR. In step S2204, the system 100 (e.g. validation component 110) validates the game instruction, for example by checking sufficient funds are available in the account 105a of first player 102a. This may involve sending a validation message to the account provider system 104, and receiving a validation response indicating that the instruction is valid. This may also cause the account 105b to be update, for example based on the value of the bet.

Subsequently, in step S2205, a shared game parameter is determined, for example by summing the two values of the game instructions placed by the two players 102. In this example, the shared game parameter may be 10 EUR. This shared game parameter is used to increment the shared session account 115. In step S2206, the shared game parameter is transmitted to the game server 106. For example, a bet corresponding to the pooled value of 10 EUR is placed.

Subsequently, the game server 106 then updates the shared session account, for example by debiting it to place the bet in step S2207. If the outcome of the bet (i.e. the game result) is a win, the game server 106 may further update the shared session account to reflect the win in a step S2208.

In step S2209, the game server 106 may send an event to the game client 104, indicating the game result. In the example, the event reflects that the result is a win, and includes the value of the win.

In response, the system 100 may calculate the winnings associated with each player device 102. This may for example involve dividing the winnings based on the proportion of the shared game parameter contributed by each player. In steps S2210 and S2211 update the player accounts in the account provider system 104.

Furthermore, in step S2212 the game result is communicated to the player devices 102, for example by streaming the game.

Figure 3A:
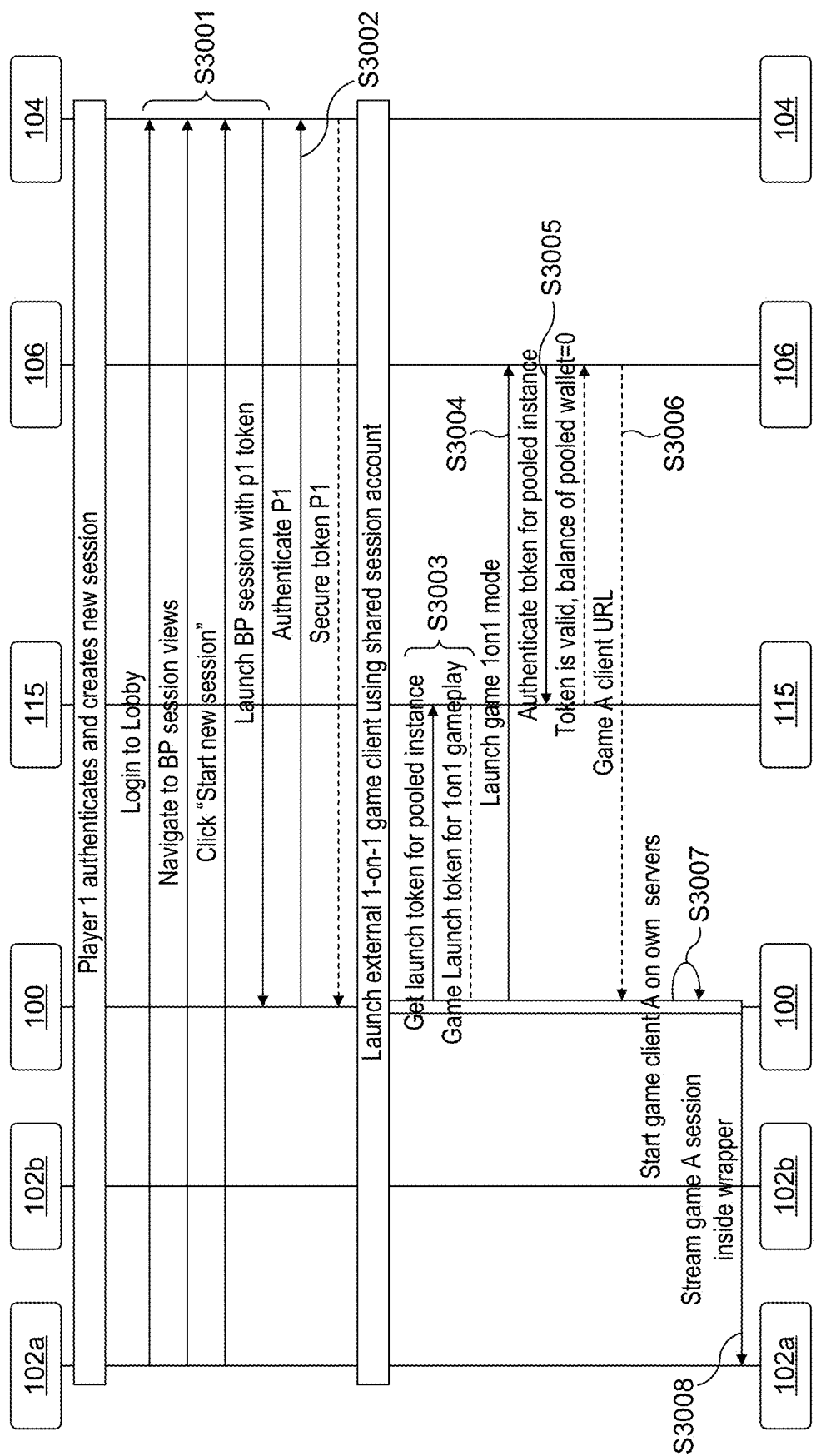
FIGS. 3A-3C are communication diagrams illustrating example operations of a gameplay system.
Figure 3B:
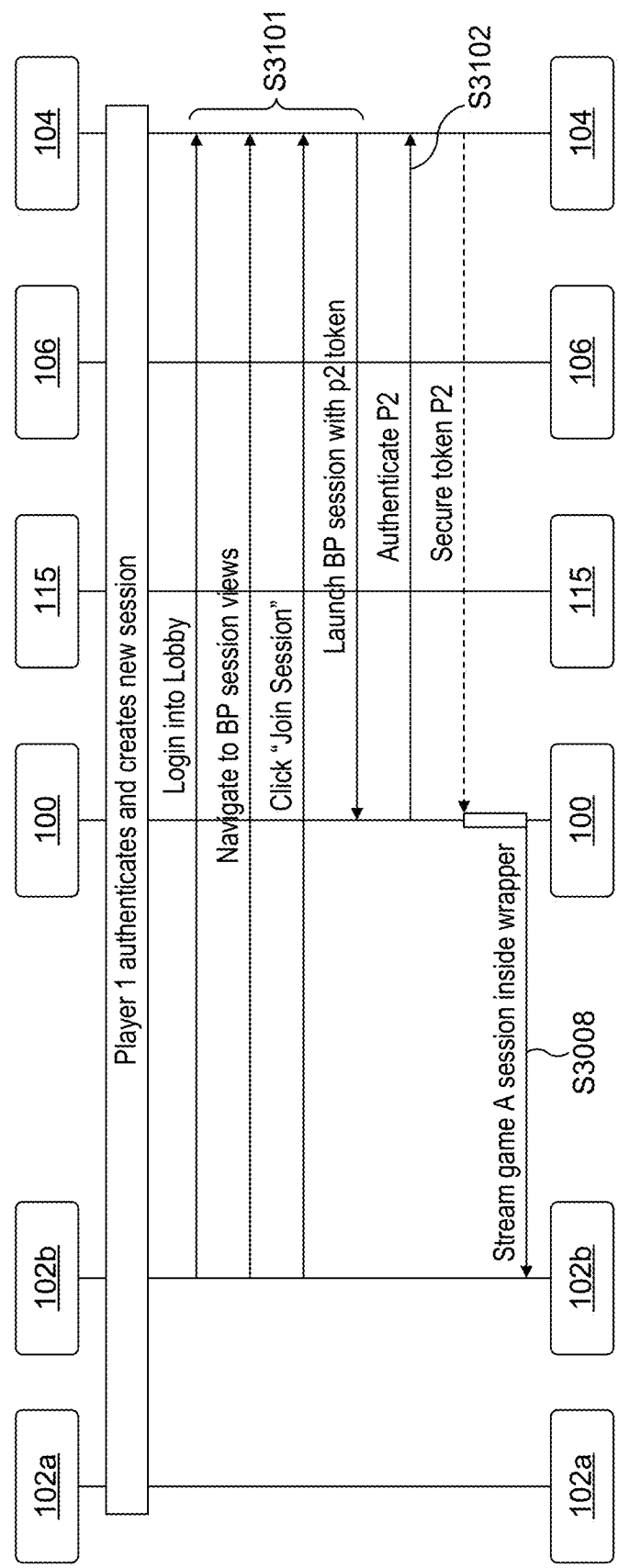
Figure 3C:
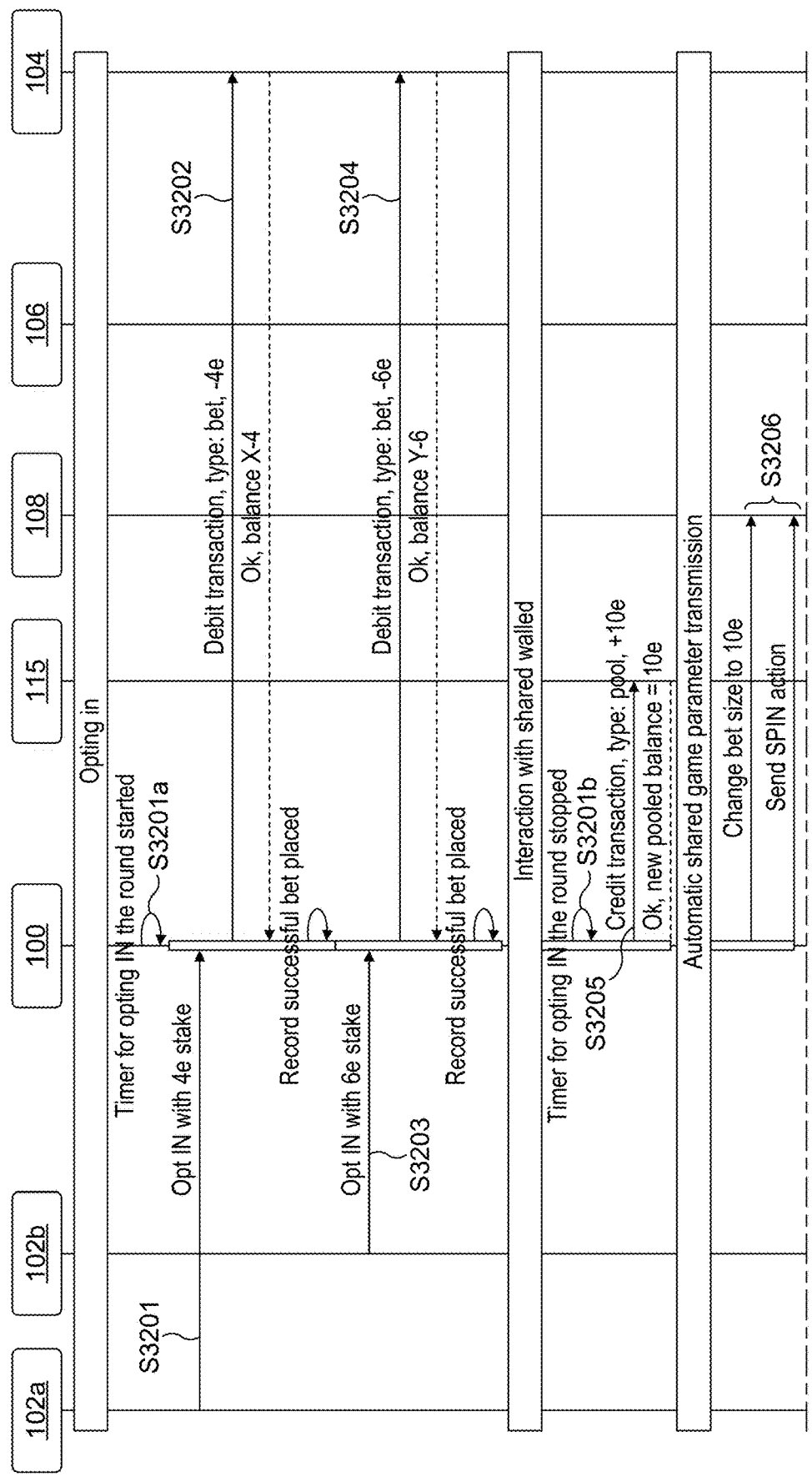
Figure 3C:
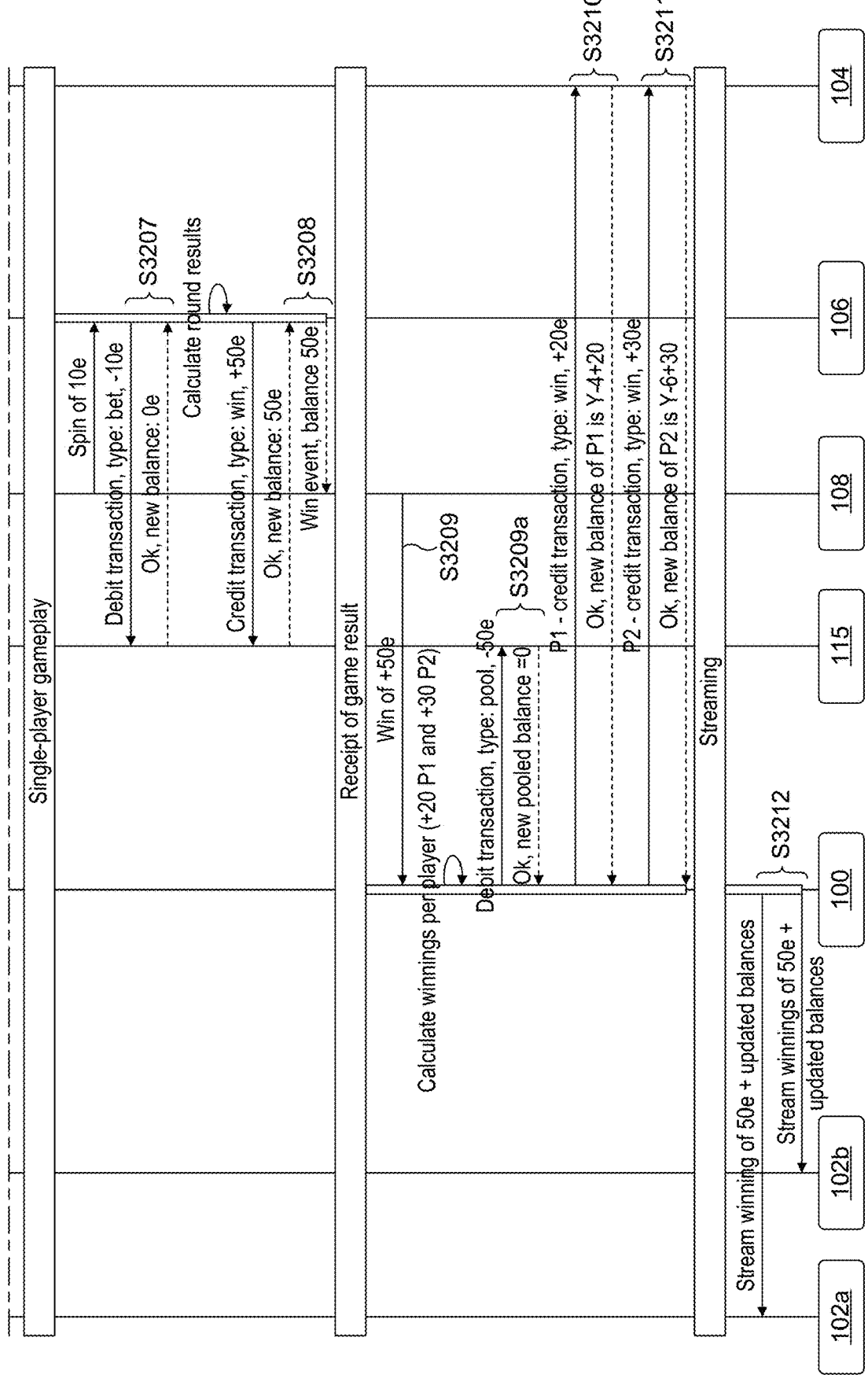

FIG. 3A-3C show similar operations to those discussed in relation to FIG. 2A-2C, in more detail. Corresponding steps have labels corresponding to those shown in FIG. 2A-C, incremented by 1000. Accordingly, only the differences will be discussed in detail.

FIG. 3A includes a step S3001 of the first player device 102a logging into the account provider system 104 (for example a lobby thereof), navigating to a view showing a plurality of multiplayer game sessions, and launching the multiplayer session therefrom. This is another example of front end functionality that may generate a session instigation request. Similarly, FIG. 3B includes step S3101 in which a second player device 102b logs into the account provider system and joins the multiplayer session therefrom. This is another example of front end functionality that may generate a session join request.

FIG. 3C illustrates in more detail some of the actions that may be taken by the game client 108. Furthermore, FIG. 3C includes a step 3201a of initiating a timer for the receipt of game instructions from connected player devices 102. When the timer expires (53201b), no further game instructions may be received for inclusion in the shared game parameter. FIG. 3C furthermore illustrates the receipt of validation responses subsequent to each validation message (S3202 and S3204). In addition, FIG. 3C also includes a step S3209a of removing the winnings from the shared session account before updating the plater accounts in the account provider system 104.

Figure 4:
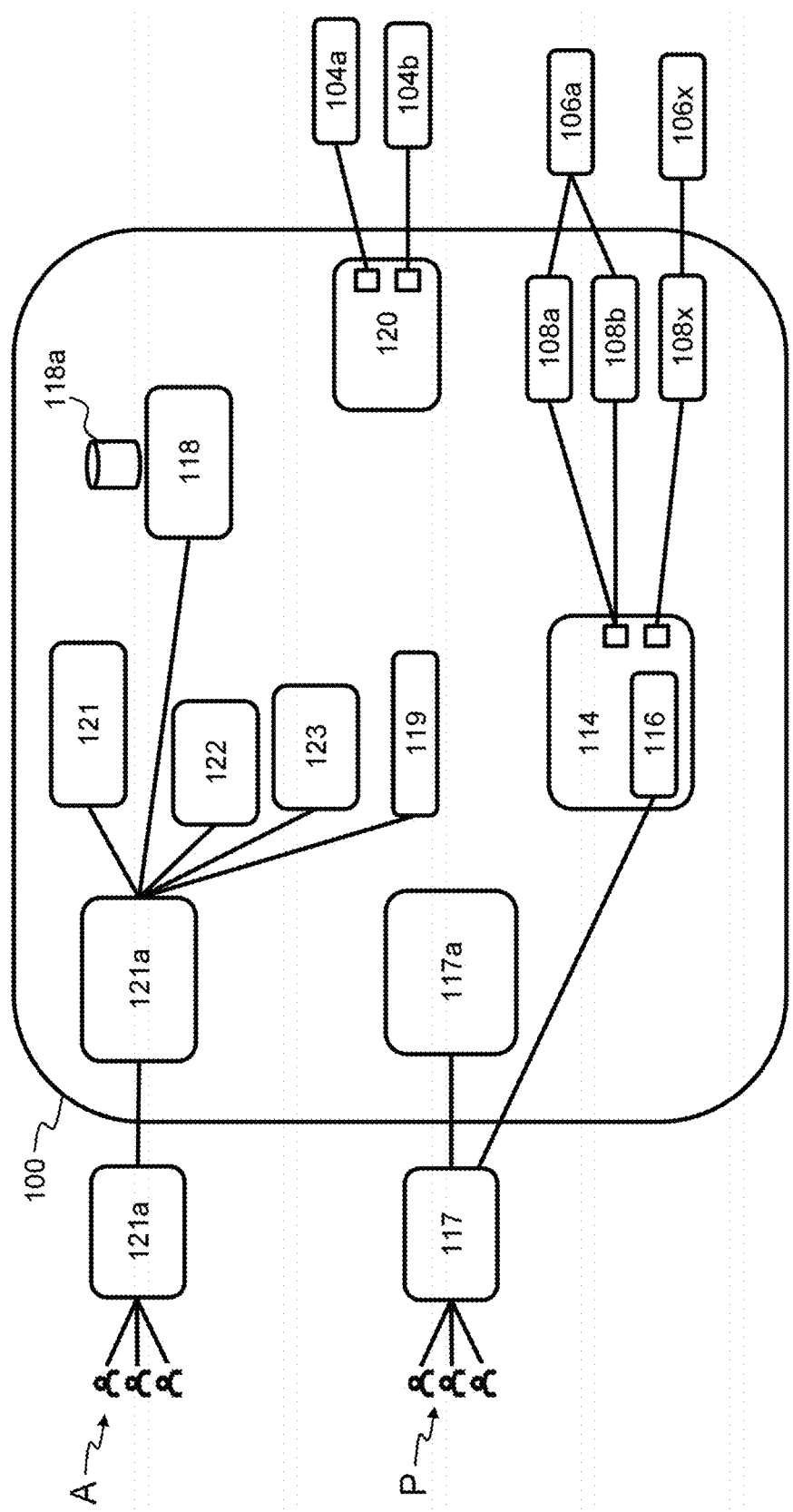
FIG. 4 is a schematic block diagram illustrating an example architecture of the gameplay system.

FIG. 4 shows a more detailed architecture diagram of the system 100. The components shown in FIG. 4 are summarized in Table 1.

TABLE 1

Architectural components.

| Component | Description |
| --- | --- |
| Frontend Game Play UI 117 | Mobile and Desktop interface for playing Shared Play by players P. The system 100 may include a gameplay API gateway 117a |
| BE Core 118 | Main component managing games, rounds, shared bets/wins. This may include a transaction database 118a |
| BE Audit 119 | Reports for operators and finance department |
| BE Game Agent 114 | Managing game client instance of provider's game. FIG. 4 illustrates that the system 100 may include a plurality of game clients 108a, 108b, 108x played by the game agent 114. FIG. 4 also illustrates that the a plurality of game clients 108a, 108b may be provided by a single game server 106a. |
| Streaming 116 | Video streaming |
| Wallet Adapter 120 | Integration layer with operators. This may form part of validation component 110 described above. FIG. 4 illustrates that the system 100 may interface with a plurality of account provider systems 104a, 104b |
| Backoffice 121 | Back office system, accounts management, replays, rounds history, accessible by administrator users A, for example via a backoffice API 121a using a front end 121b. |
| Players 122 | Service that deals only with player P information, logging, profiles, actions, avatars, followers |
| Messages 123 | Handles chat messages between players P |

Figure 5A:
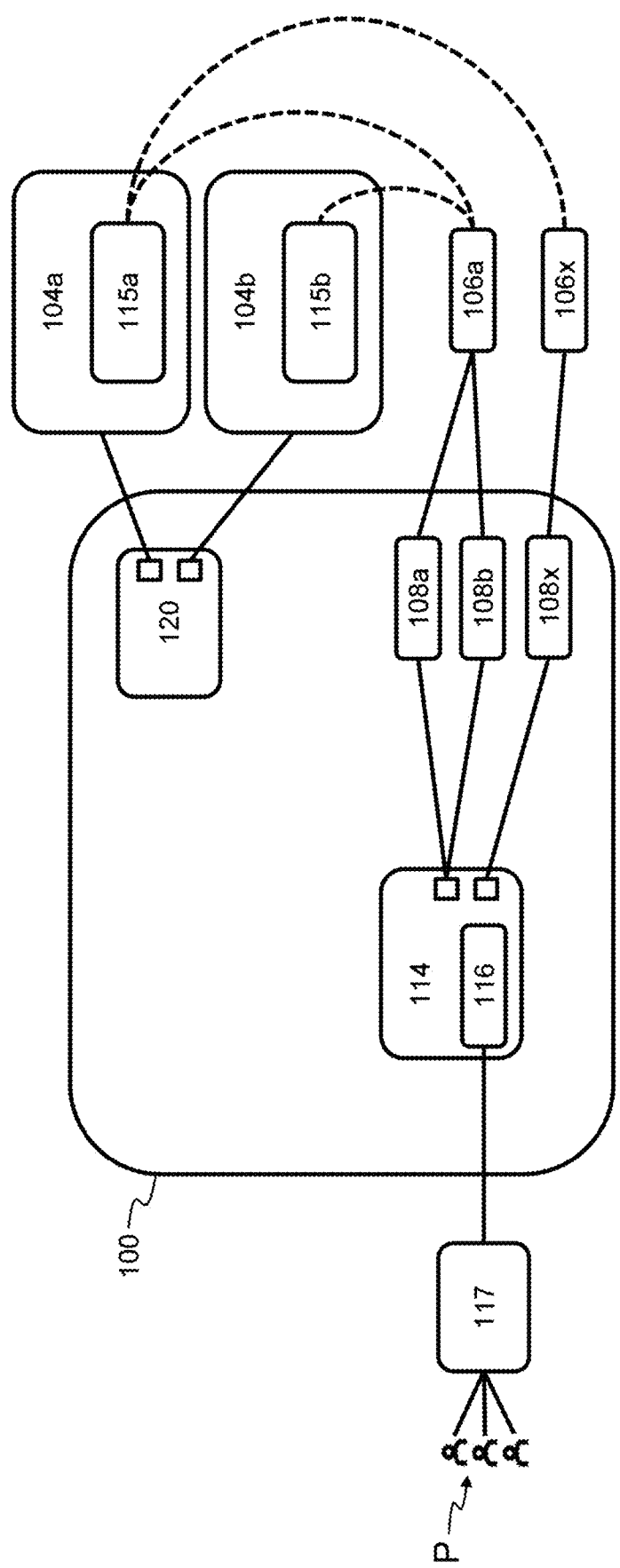
FIG. 5A is a schematic block diagram of an example distributed computer system where the shared session account is part of the account provider system.

FIG. 5A is a component diagram which illustrates that shared session accounts 115a,b can form part of respective account provider systems 104a,104b. FIG. 5A also illustrates there need not be a 1-to-1 relationship between account providers 104 and game servers 106. For example, game server 106a may access accounts 115a and 115b on different account provider systems 104a,b.

Figure 5B:
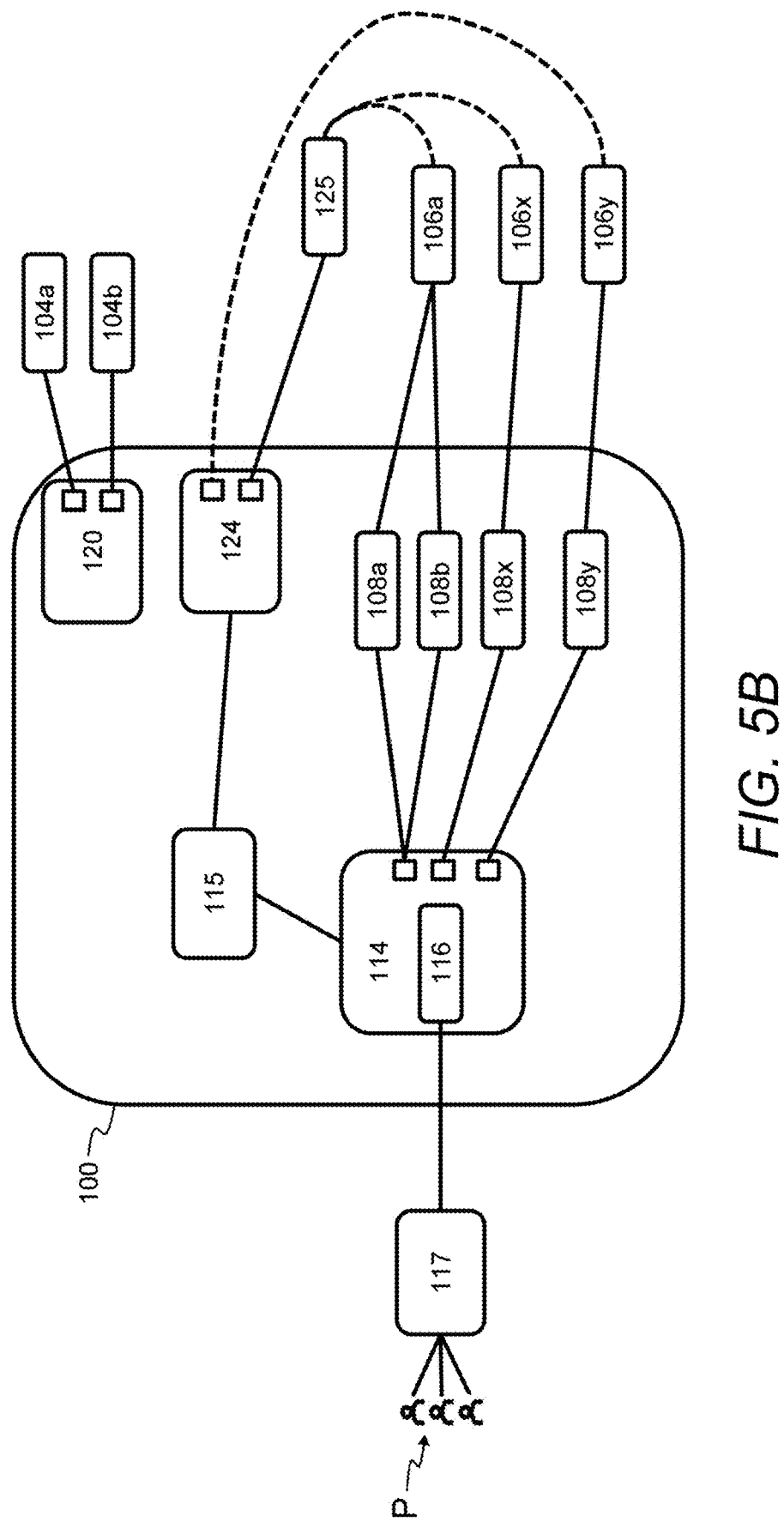
FIG. 5B is a schematic block diagram of an example distributed computer system where the shared session account is part of the account provider system.

FIG. 5B is a component diagram which illustrates an example in which the shared session account 115 forms part of the gameplay system 100. In this example, the gameplay system 100 may comprise an adaptor 124 configured to update the shared session account based on data received from the game servers 106. In some examples, the data is received from an aggregator 125, which Returning now to FIG. 1, streaming of the game will now be discussed in more detail. For every game running, there is an associated Agent instance 114 that runs within the gameplay system 100, whose functions include: running the game itself; allowing a backend Core 118 to externally control the game; capturing and streaming the game to the players; and receiving money updates from the game.

Agents may be spawned per game as separate processes, for example on a server machine. During their initialization, a browser instance (the game client 108 in this implementation) is spawned. The browser is caused to load a GameWrapper, which is a web page with an iframe and a JS bundle. Then, a page with the target game is loaded into the iframe.

Each new GameWrapper instance may connect and report itself back to a websocket server in the Core 118, so that it can be centrally managed further on. Any communication between these two services takes place via websocket events, including a stream initialization protocol for every 'viewer' (player receiving the video stream), as well as the exchange of game events.

Streaming is described in more detail below.

A game may be implemented as a content unit. The system 100 can run a game as any kind of a website/web app that it is possible to run and render in a browser and, preferably, exposes controls via some kind of a standardized window.postMessage API (or, less preferably, via emulating user input if such as API is not available).

It is possible to pass different game configurations to the game agent 114 as needed to support different types of game.

Calls to the game agent 114 may be wrapped in some kind of translation library to support multiple kinds of event APIs and select the proper event API based on what game is being run.

Games can both accept events and generate them—the former is allowed as a way to control the game—e.g to set the bet value, spin a machine etc. while the latter is a way for the system 100 to receive information about the state of the game—e.g. the value of the spin result.

Both directions of event flows are accomplished with a combination of iframe's window.postMesages and websocket events.

To execute a control event upon the game, a websocket event is sent to the appropriate Agent 114 websocket client for a specific game. The event is parsed on the Agent 114 side, and an appropriate window.postMessage is executed.

Whenever a significant event is generated in the game, the game generates a window.postMessage event that the system 100 catches with a callback. That event is parsed and an appropriate websocket event back is passed back to the Core 118.

A live game may be streamed as video to the players P and viewers in real time. To achieve this, for every new game, the Core 118 spawns a separate Game Agent 114 instance (this could be a separate process running on a single same machine, or a new machine might be created for a cluster of games). To make screen captures possible while running on server side, the browser is run in a virtual frame buffer, with a screen capture plugin (such as Puppeteer). During its initialization, system 100 opens a browser session with Puppeteer, then makes it load a special webpage called GameWrapper which contains an iframe. The target game is loaded into the iframe, and the Core 118 takes over the control of the game.

A streaming server is set up, and a screen capture is initialized in the browser of the whole window. The GameWrapper connects to the Core 118 websocket server, relaying connection requests to the appropriate GameWrapper websocket client instance. References for both the connection and the stream are stored so that they can be reused when handling every new incoming request to receive a stream. After everything is up and running, the Game Agent acknowledges the Core that it's ready to be used.

Then, whenever a new client connects, a new webRTC connection is established between the GameWrapper code instance and the player's browser (running a UserInterface). Details of the protocol may be found at the following URL, the content of which are incorporated herein by reference: https://developer.mozilla.org/en-US/docs/Web/API/WebRTC_API/Signaling_and_video_calling #signaling_transaction_flow.

WebRTC (Web Real-Time Communication) allows audio and video communication to work inside web pages by allowing direct peer-to-peer communication, eliminating the need to install plugins or download native apps.

WebRTC is one of the most commonly used protocols for streaming media. It was selected for streaming the view of the game to the players due to its sub-second latency, allowing players to interact with the game in real time. Due to its introduced delay, an RTMP stream is noticeably slower, thus less preferable solution in this use case.

In one example, the gameplay system 100 described herein further includes a selectable bet sizing algorithm, which aims at matching total player pooled bet to the highest possible fixed game provider's bet size.

The system's multiplayer interface provides a selection of bet increments calculated based on the minimum individual bet that the game is able to accept all the way to the maximum individual bet that is allowed per multiplayer room. The latter is calculated based on either the maximum pooled bet or based on the maximum exposure set by the operator. Maximum exposure divided by the theoretical win configured by the game provider for any particular game instance and the total number of seats in the room results in the maximum pooled bet. Depending on which value is provided by the operator (the maximum exposure or the maximum pooled bet), the system 100 limits the bet increment selection in the interface to avoid the casino operator being exposed to winning payouts above the configured values in case a win takes place.

To be able to run the algorithm, the system 100 must know the bet increments that the game is able to accept and process during the game round in order to reach the game round result. This array of increments is communicated by the game provider and is set in the system 100 on game configuration.

Upon the players choosing their individual bets from the bet selection provided by the multiplayer interface, the system 100 validates each individual bet against that player's wallet. Upon the successful validation, the system 100 calculates the total pooled bet from all committed players for the particular game round. The pooled value is then compared to the closest maximum increment from the array configured on the game.

If a difference between the total pooled bet and the closest maximum bet increment supported by the game is detected, it is a subject for return to the players. To do so, the algorithm keeps track of the proportions of each individual bet with respect to the total pooled amount in its system and applies them when calculating the individual returns to players. As a rule, the players with lower bets get lower returns, and the players with the higher bets—get higher returns, which all are driven by the proportions stored on in the system for the period of the game cycle.

The system performs the validation of each individual bet and the calculations of accepted and returned amounts prior to submitting the group bet into the game (e.g. before sending it to the game server, as discussed in relation to step S2206 of FIG. 2C above). The players get communications in the interface of the original amount they committed to, the accepted bet, and the returned amount that is put back into their respective balances.

The game round is initiated only after all checks have been performed and the players are charged the validated bet amounts. Upon the game returning a spin result, the system 100 proceeds with the algorithm of splitting the result between all committed and validated players, for example as discussed in relation for steps S2210 and S2211 above.

Accordingly, the methods described herein may comprise selecting parameters of the first game instruction and/or second game instruction from a predetermined list of values. The methods may also comprise validating the shared game parameter before transmission to the game server. If a value of the shared game parameter exceeds a predetermined threshold value (e.g. the maximum bet increment), the predetermined threshold value may be used as the shared game parameter. The difference between the predetermined threshold value and the shared game parameter may then be returned to the wallets of the player devices.

It will be appreciated that the examples described above are illustrative rather than exhaustive. A player device can take various forms, including a mobile device, personal computer, wearable device etc. Code, software and the like may be embodied as program instructions stored in memory and executed on one or more computer processors (e.g. CPUs). A computer system comprises computing hardware which may be configured to execute any of the steps or functions taught herein. The term computing hardware encompasses any form/combination of hardware configured to execute steps or functions taught herein. Such computing hardware may comprise one or more processors, which may be programmable or non-programmable, or a combination of programmable and non-programmable hardware may be used. Examples of suitable programmable processors include general purpose processors based on an instruction set architecture, such as CPUs, GPUs/accelerator processors etc. Such general-purpose processors typically execute computer readable instructions held in memory coupled to the processor and carry out the relevant steps in accordance with those instructions. Other forms of programmable processors include field programmable gate arrays (FPGAs) having a circuit configuration programmable through circuit description code. Examples of non-programmable processors include application specific integrated circuits (ASICs). Code, instructions etc. may be stored as appropriate on transitory or non-transitory media (examples of the latter including solid state, magnetic and optical storage device(s) and the like).

The invention claimed is:

1. A computer-implemented method of delivering a multiplayer gaming experience by a gameplay system, the gameplay system in communication with a first player device and a second player device, the method comprising:
    establishing a multiplayer game session between the gameplay system, the first player device and the second player device;
    transmitting a game initiation message from the gameplay system to a game server, and thereby causing the game server to initiate a single-player modality game associated with the multiplayer game session;
    receiving at the gameplay system a first game instruction from the first player device;
    receiving at the gameplay system a second game instruction from the second player device;
    transmitting to an account provider system one or more validation messages indicating the first and second game instructions for validating the first and second game instructions based on first and second player accounts associated with the first and second player devices respectively;
    receiving from the account provider system one or more validation responses indicating whether the first and second game instructions are valid;
    based on the one or more validation responses, determining a shared game parameter from the first game instruction and second game instruction for the single-player modality game;
    causing the shared game parameter to be transmitted to the game server, the shared game parameter forming a single-player input to the single-player modality game;
    receiving a game result from the game server, the game result having been generated at the gameplay server by implementing a game action in the single-player modality game based on the shared game parameter; and
    communicating the game result from the gameplay system to the first player device and the second player device in the multiplayer game session.

2. The method of claim 1, comprising:
    associating a session account with the multiplayer game session, wherein the session account is indicated to the game server, and is accessible to the game server for validating the shared game parameter; and
    updating the session account based on the one or more validation responses received from the account provider.

3. The method of claim 2, wherein the game result received from the game server indicates that the session account has been updated by the game server, the method comprising:
    responsive to receiving the game result, accessing, by the gameplay system, the session account as updated by the game server; and
    transmitting, to the account provider system, one or more update messages based on the session account as updated by the game server, the one or more update messages causing the first and second player accounts to be updated.

4. The method of claim 2, wherein the session account is indicated to the game server by a shared account token in the game initiation message to be authenticated by the game server.

5. The method of claim 1, wherein the multiplayer game session is instigated initially between the gameplay system and the first player device responsive to a session instigation request received from the first player device, the first player device being authenticated with the account provider responsive to the session instigation request;
    wherein, responsive to instigating the game session, the game initiation message is transmitted to the game server;
    wherein the second player device is subsequently added to the multiplayer game session responsive to a join request identifying the multiplayer game session and received from the second player device, the second player device being authenticated with the account provider responsive to the join request without any interaction between the gameplay system and the game server.

6. The method of claim 2, wherein the multiplayer game session is instigated initially between the gameplay system and the first player device responsive to a session instigation request received from the first player device, the first player device being authenticated with the account provider responsive to the session instigation request;

wherein, responsive to instigating the game session, the game initiation message is transmitted to the game server;

wherein the second player device is subsequently added to the multiplayer game session responsive to a join request identifying the multiplayer game session and received from the second player device, the second player device being authenticated with the account provider responsive to the join request without any interaction between the gameplay system and the game server; and wherein the session account is associated with the multiplayer game session responsive to the session instigation request from the first player device.

7. The method of claim 1, comprising:

instantiating a game client at the gameplay system, thereby creating a game client instance associated with the multiplayer game session, wherein the game parameter is provided as an input to the game client, thereby causing the game client instance to transmit the game parameter to the game server.

8. The method of claim 1, wherein establishing the multiplayer game session includes authenticating the first and second player devices with the account provider system.

9. A gameplay system comprising a memory operable to store program code and one or more computer processors coupled to the memory for executing the program code, the program code configured, when executed, to:

establish a multiplayer game session between the gameplay system, the first player device and the second player device;

transmit a game initiation message from the gameplay system to a game server, and thereby causing the game server to initiate a single-player modality game associated with the multiplayer game session;

receive at the gameplay system a first game instruction from the first player device;

receive at the gameplay system a second game instruction from the second player device;

transmit to an account provider system one or more validation messages indicating the first and second game instructions for validating the first and second game instructions based on first and second player accounts associated with the first and second player devices respectively;

receive from the account provider system one or more validation responses indicating whether the first and second game instructions are valid;

based on the one or more validation responses, determine a shared game parameter from the first game instruction and second game instruction for the single-player modality game;

cause the shared game parameter to be transmitted to the game server, the shared game parameter forming a single-player input to the single-player modality game;

receive a game result from the game server, the game result having been generated at the gameplay server by implementing a game action in the single-player modality game based on the shared game parameter; and communicate the game result from the gameplay system to the first player device and the second player device in the multiplayer game session.

10. The gameplay system of claim 9, wherein the program code is configured, when executed, to:

associate a session account with the multiplayer game session, wherein the session account is indicated to the game server, and is accessible to the game server for validating the shared game parameter; and update the session account based on the one or more validation responses received from the account provider.

11. The gameplay system of claim 10, wherein the game result received from the game server indicates that the session account has been updated by the game server, wherein the program code is configured, when executed, to:

responsive to receiving the game result, access, by the gameplay system, the session account as updated by the game server; and transmit, to the account provider system, one or more update messages based on the session account as updated by the game server, the one or more update messages causing the first and second player accounts to be updated.

12. The gameplay system of claim 10, wherein the session account is indicated to the game server by a shared account token in the game initiation message to be authenticated by the game server.

13. The gameplay system of claim 9, wherein the program code is configured, when executed, to:

initially instigate the multiplayer game session between the gameplay system and the first player device responsive to a session instigation request received from the first player device, the first player device being authenticated with the account provider responsive to the session instigation request;

responsive to instigating the game session, transmit the game initiation message to the game server;

subsequently add the second player device to the multiplayer game session responsive to a join request identifying the multiplayer game session and received from the second player device, the second player device being authenticated with the account provider responsive to the join request without any interaction between the gameplay system and the game server.

14. The gameplay system of claim 10, wherein the program code is configured, when executed, to:

initially instigate the multiplayer game session between the gameplay system and the first player device responsive to a session instigation request received from the first player device, the first player device being authenticated with the account provider responsive to the session instigation request;

responsive to instigating the game session, transmit the game initiation message to the game server;

subsequently add the second player device to the multiplayer game session responsive to a join request identifying the multiplayer game session and received from the second player device, the second player device being authenticated with the account provider responsive to the join request without any interaction between the gameplay system and the game server; and wherein the session account is associated with the multiplayer game session responsive to the session instigation request from the first player device.

15. The gameplay system of claim 10, wherein the program code is configured, when executed, to:

instantiate a game client at the gameplay system, thereby creating a game client instance associated with the multiplayer game session, wherein the game parameter is provided as an input to the game client, thereby causing the game client instance to transmit the game parameter to the game server.

16. The gameplay system of claim 9, wherein the program code is configured, when executed, to:
establish the multiplayer game session by authenticating the first and second player devices with the account provider system.

17. A non-transitory computer readable storage medium comprising computer program code configured, when executed in a gameplay system, to:
establish a multiplayer game session between the gameplay system, the first player device and the second player device;
transmit a game initiation message from the gameplay system to a game server, and thereby causing the game server to initiate a single-player modality game associated with the multiplayer game session;
receive at the gameplay system a first game instruction from the first player device;
receive at the gameplay system a second game instruction from the second player device;
transmit to an account provider system one or more validation messages indicating the first and second game instructions for validating the first and second game instructions based on first and second player accounts associated with the first and second player devices respectively;
receive from the account provider system one or more validation responses indicating whether the first and second game instructions are valid;
based on the one or more validation responses, determine a shared game parameter from the first game instruction and second game instruction for the single-player modality game;
cause the shared game parameter to be transmitted to the game server, the shared game parameter forming a single-player input to the single-player modality game;
receive a game result from the game server, the game result having been generated at the gameplay server by implementing a game action in the single-player modality game based on the shared game parameter; and
communicate the game result from the gameplay system to the first player device and the second player device in the multiplayer game session.

18. The non-transitory computer readable storage medium of claim 17, wherein the program code is configured, when executed, to:
associate a session account with the multiplayer game session, wherein the session account is indicated to the game server, and is accessible to the game server for validating the shared game parameter; and
update the session account based on the one or more validation responses received from the account provider.

19. The non-transitory computer readable storage medium of claim 18, wherein the game result received from the game server indicates that the session account has been updated by the game server,
wherein the program code is configured, when executed, to:
responsive to receiving the game result, access, by the gameplay system, the session account as updated by the game server; and
transmit, to the account provider system, one or more update messages based on the session account as updated by the game server, the one or more update messages causing the first and second player accounts to be updated.

20. The non-transitory computer readable storage medium of claim 18, wherein the session account is indicated to the game server by a shared account token in the game initiation message to be authenticated by the game server.

* * * * *